US012804505B2

(12) United States Patent
Stanczak et al.

(10) Patent No.: US 12,804,505 B2
(45) Date of Patent: Nov. 17, 2026

(54) CONDITIONAL HANDOVER RECOVERY IN NON-TERRESTRIAL NETWORKS

(71) Applicant: Nokia Technologies Oy, Espoo (FI)

(72) Inventors: Jedrzej Stanczak, Wroclaw (PL); Ahmad Awada, Munich (DE); Mads Lauridsen, Aalborg (DK); Jeroen Wigard, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 249 days.

(21) Appl. No.: 18/726,888

(22) PCT Filed: Jan. 5, 2022

(86) PCT No.: PCT/EP2022/050117
§ 371 (c)(1),
(2) Date: Jul. 5, 2024

(87) PCT Pub. No.: WO2023/131401
PCT Pub. Date: Jul. 13, 2023

(65) Prior Publication Data
US 2025/0168738 A1 May 22, 2025

(51) Int. Cl.
*H04W 36/36* (2009.01)
*H04W 76/19* (2018.01)

(52) U.S. Cl.
CPC ......... *H04W 36/362* (2023.05); *H04W 76/19* (2018.02)

(58) Field of Classification Search
CPC ............... H04W 36/362; H04W 76/19; H04W 36/0088; H04W 84/06
See application file for complete search history.

(56) References Cited

U.S. PATENT DOCUMENTS 10,993,152 B2 * 4/2021 Kang ................ H04W 36/0058
2021/0058834 A1 2/2021 Paladugu et al.
(Continued)

FOREIGN PATENT DOCUMENTS

WO 2020/231123 A1 11/2020
WO 2021/223678 A1 11/2021
(Continued)

OTHER PUBLICATIONS

"3rd Generation Partnership Project; Technical Specification Group Radio Access Network; NR; NR and NG-RAN Overall Description; Stage 2", 3GPP TS 38.300, V16.7.0, Sep. 2021, pp. 1-152.
(Continued)

*Primary Examiner* — Lam T Mai
(74) *Attorney, Agent, or Firm* — Nokia Technologies Oy

(57) ABSTRACT

Systems, methods, and apparatuses for CHO recovery in NTN are provided. One method may include a UE selecting at least one cell of a NTN, determining whether the selected cell is a CHO candidate cell and, when it is determined that the selected cell is a CHO candidate cell, evaluating one or more CHO conditions. The evaluating may include: determining if a timer measuring a duration of a time window within which the UE is allowed to execute the CHO is running or if a distance between the UE and the selected cell is below a configurable threshold, determining if an expiration of the timer or the distance is within a defined offset, and/or determining if the selected at least one cell is within a chain of CHOs list. When it is determined that the CHO condition(s) are met, attempting the CHO procedure to the selected cell.

19 Claims, 7 Drawing Sheets

(56) References Cited

U.S. PATENT DOCUMENTS

| | | | | |
|---|---|---|---|---|
| 2021/0176682 | A1* | 6/2021 | Guo | H04W 36/00837 |
| 2021/0227442 | A1* | 7/2021 | Yiu | H04W 36/0058 |
| 2021/0321310 | A1 | 10/2021 | Latheef et al. | |
| 2022/0070746 | A1* | 3/2022 | Yiu | H04L 5/0053 |
| 2025/0280347 | A1* | 9/2025 | Murugaiyan | H04W 36/0088 |
| 2026/0019914 | A1* | 1/2026 | Du | H04W 36/362 |

FOREIGN PATENT DOCUMENTS

| | | |
|---|---|---|
| WO | 2022/056786 A1 | 3/2022 |
| WO | 2023/000118 A1 | 1/2023 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.6.0, Sep. 2021, pp. 1-961.

"3rd Generation Partnership Project; Technical Specification Group Radio Access Network; Solutions for NR to support non-terrestrial networks (NTN) (Release 16)", 3GPP TR 38.821, V16.1.0, May 2021, pp. 1-140.

"Msc-generator", Sourceforge, Retrieved on Jul. 23, 2024, Webpage available at : https://sourceforge.net/projects/msc-generator/.

"Connected mode aspects for NTN", 3GPP TSG-RAN WG2 Meeting #116 electronic, R2-2110340, Agenda: 8.10.3.3, Ericsson, Nov. 1-12, 2021, pp. 1-16.

"Measurement Report for Conditional Handover Procedures", 3GPP TSG-RAN WG2 Meeting #108, R2-19xxxxx, Agenda: 6.9.3.3, MediaTek Inc., Nov. 18-22, 2019, pp. 1-5.

International Search Report and Written Opinion received for corresponding Patent Cooperation Treaty Application No. PCT/EP2022/050117, dated Jul. 26, 2022, 15 pages.

"Remaining issues in NTN CHO", 3GPP TSG-RAN WG2 Meeting #116-e, R2-2110229, Agenda: 8.10.3.3, LG Electronics Inc., Nov. 1-12, 2021, 3 pages.

"[AT115-e][103][NTN] CHO and NTN-TN mobility aspects (Ericsson)", 3GPP TSG-RAN WG2 Meeting #115, Tdoc R2-2109056, Agenda: 8.10.3.3, Ericsson, Aug. 9-13, 2021, 37 pages.

"Mobility Failure Recovery in NR", 3GPP TSG-RAN WG2 Meeting #106, R2-1906485, Agenda: 11.9.3.2, MediaTek Inc., May 13-17, 2019, 6 pages.

"Resolving open NTN issues for CONNECTED mode", 3GPP TSG-RAN WG2 Meeting #118 Electronic, R2-2205529, Agenda: 6.10.3.2.1, Nokia, May 9-20, 2022, 4 pages.

* cited by examiner

CONDITIONAL HANDOVER RECOVERY IN NON-TERRESTRIAL NETWORKS

RELATED APPLICATION

This application was originally filed as a Patent Cooperation Treaty Application No. PCT/EP2022/050117 filed on Jan. 5, 2022, which is hereby incorporated in its entirety.

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for conditional handover (CHO) recovery for non-terrestrial networks (NTN).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment is directed to an apparatus including at least one processor and at least one memory comprising computer program code. The at least one memory and computer program code configured, with the at least one processor, to cause the apparatus at least to select at least one cell of a non-terrestrial network when a mobility failure occurs, to determine whether the selected at least one cell is a conditional handover candidate cell, and, when it is determined that the selected at least one cell is a conditional handover candidate cell, to evaluate one or more conditional handover conditions. The evaluating of the handover condition(s) may include at least one of: determining whether a timer measuring a duration of a time window within which the apparatus is allowed to execute the conditional handover is running or whether a distance between the apparatus and the selected at least one cell is below a configurable threshold, and/or determining whether an expiration of the timer or the distance is within a defined offset, and/or determining whether the selected at least one cell is within a chain of conditional handovers list. When the evaluating determines that the one or more conditional handover conditions are met, the at least one memory and computer program code configured, with the at least one processor, to cause the apparatus at least to attempt the conditional handover procedure or perform the conditional handover procedure towards the selected at least one cell.

An embodiment is directed to a method that may include, when a mobility failure occurs, selecting, by a user equipment, at least one cell of a non-terrestrial network. The method may also include determining, by the user equipment, whether the selected at least one cell is a conditional handover candidate cell. When it is determined that the selected at least one cell is a conditional handover candidate cell, the method includes evaluating, by the user equipment, one or more conditional handover conditions. The evaluating of the handover condition(s) may include at least one of: determining whether a timer measuring a duration of a time window within which the apparatus is allowed to execute the conditional handover is running or whether a distance between the apparatus and the selected at least one cell is below a configurable threshold, and/or determining whether an expiration of the timer or the distance is within a defined offset, and/or determining whether the selected at least one cell is within a chain of conditional handovers list. When the evaluating determines that the one or more conditional handover conditions are met, the method may include attempting the conditional handover procedure or performing the conditional handover procedure towards the selected at least one cell.

An embodiment may be directed to an apparatus that may include, when a mobility failure occurs, means for selecting at least one cell of a non-terrestrial network. The apparatus may also include means for determining whether the selected at least one cell is a conditional handover candidate cell and, when it is determined that the selected at least one cell is a conditional handover candidate cell, means for evaluating one or more conditional handover conditions. The means for evaluating may include at least one of: means for determining whether a timer measuring a duration of a time window within which the apparatus is allowed to execute the conditional handover is running or whether a distance between the apparatus and the selected at least one cell is below a configurable threshold, and/or means for determining whether an expiration of the timer or the distance is within a defined offset, and/or means for determining whether the selected at least one cell is within a chain of conditional handovers list. When the evaluating determines that the one or more conditional handover conditions are met, the apparatus includes means for attempting the conditional handover procedure towards the selected at least one cell.

An embodiment is directed to a non-transitory computer readable medium comprising program instructions stored thereon for performing the following: when a mobility failure occurs, selecting, by a user equipment, at least one cell of a non-terrestrial network. The method may also include determining, by the user equipment, whether the selected at least one cell is a conditional handover candidate cell. When it is determined that the selected at least one cell is a conditional handover candidate cell, the method includes evaluating, by the user equipment, one or more conditional handover conditions. The evaluating of the handover condition(s) may include at least one of: determining whether a timer measuring a duration of a time window within which the apparatus is allowed to execute the conditional handover is running or whether a distance between the apparatus and the selected at least one cell is below a configurable threshold, and/or determining whether an expiration of the timer or the distance is within a defined offset, and/or determining whether the selected at least one cell is within a chain of conditional handovers list. When the evaluating determines that the one or more conditional handover conditions are met, the method may include attempting the conditional handover procedure or performing the conditional handover procedure towards the selected at least one cell.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for conditional handover (CHO) recovery in non-terrestrial networks (NTN), is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

NTN deployment scenarios may include using low-earth orbit (LEO) satellites, for example at altitudes of 600 km to 1200 km, in a transparent architecture to facilitate communication between one or more user equipment (UE) and a base station on Earth. Further scenarios can be expected to include a regenerative architecture, where the base station is onboard the satellite.

Figure 1:
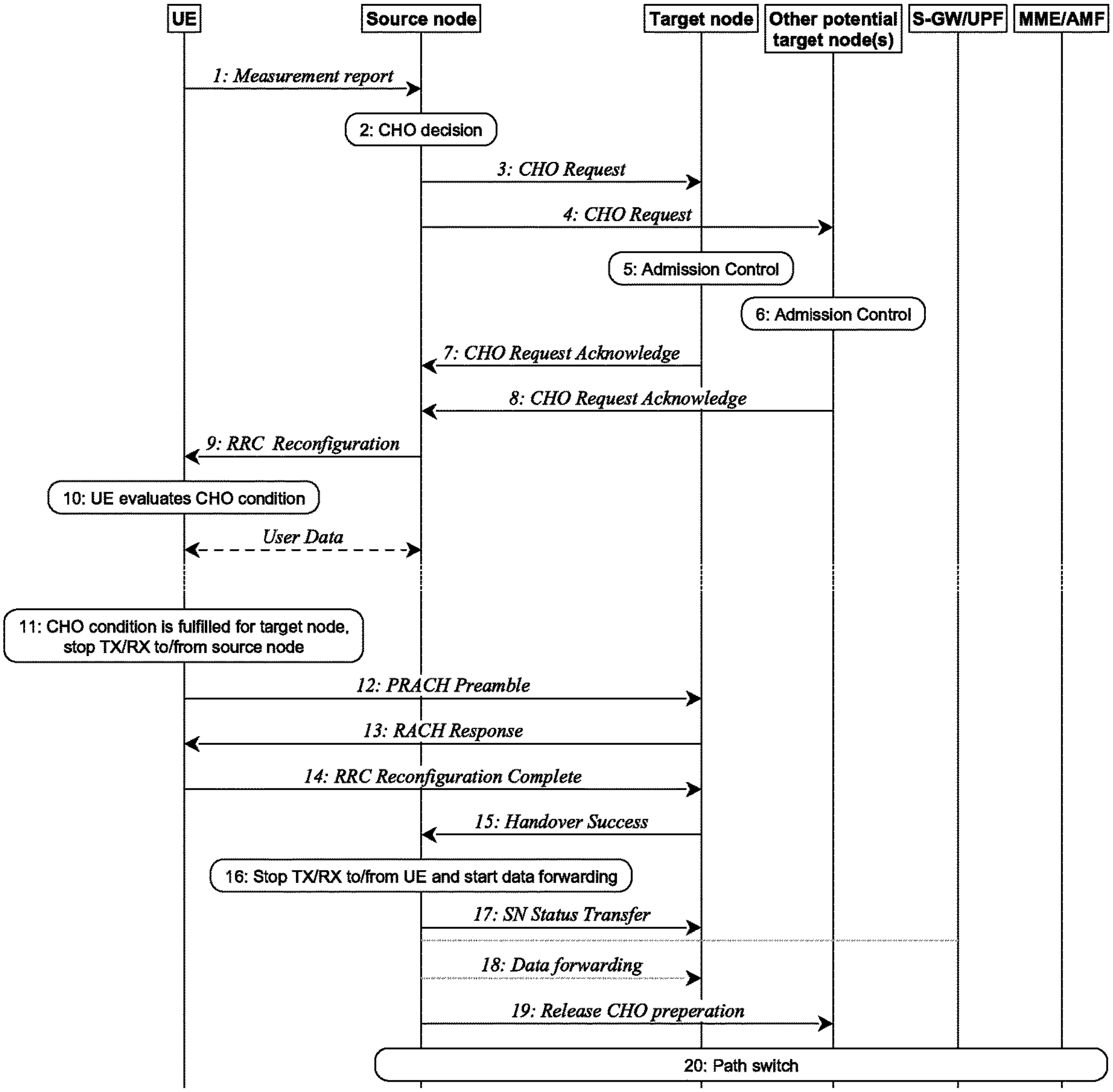
FIG. 1 illustrates an example signaling diagram depicting a CHO procedure, according to an embodiment.

CHO was defined in the Third Generation Partnership Project (3GPP) Release-16 and aims to increase the handover robustness by decoupling the handover (HO) preparation and HO execution phases. CHO is a promising mechanism, which is also designed with some NTN-specific enhancements. FIG. 1 illustrates an example of a signaling diagram depicting the CHO scheme. In the example of FIG. 1, procedures 1 to 9 may be similar to the baseline HO (BHO) of NR Release-15. At 1, a configured event triggers the UE to send a measurement report. Based on this report, at 2, the source node may make a CHO decision. As shown at procedures 3 to 8 in the example of FIG. 1, the source node can then prepare one or more target cells for the handover (CHO Request+CHO Request Acknowledge) and then may send, at 9, an RRC Reconfiguration (handover command) to the UE. For BHO, the UE will immediately access the target cell to complete the handover. However, for CHO, the UE will only access the target cell once an additional CHO execution condition expires (i.e., the HO preparation and execution phases are decoupled). In this case, the UE may evaluate, at 10, the CHO condition and, when the CHO condition is fulfilled for the target node, as shown at 11, the UE may stop transmission/reception to/from the source node. The condition may be configured, for example, by the source node in HO Command. Procedures 12 to 20 in the example of FIG. 1 complete the CHO process. The advantage of the CHO is that the HO command can be sent very early, when the UE is still safe in the source cell, without risking the access in the target cell and the stability of its radio link. That is, conditional handover provides mobility robustness.

Figure 2:
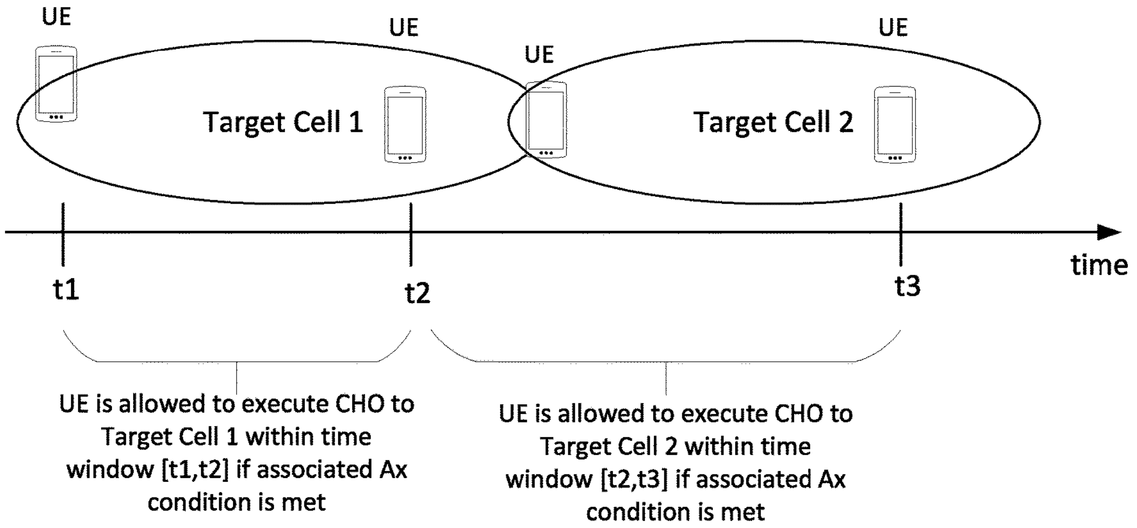
FIG. 2 illustrates an example of time-based CHO triggering in NTN, according to an embodiment.
Figure 3:
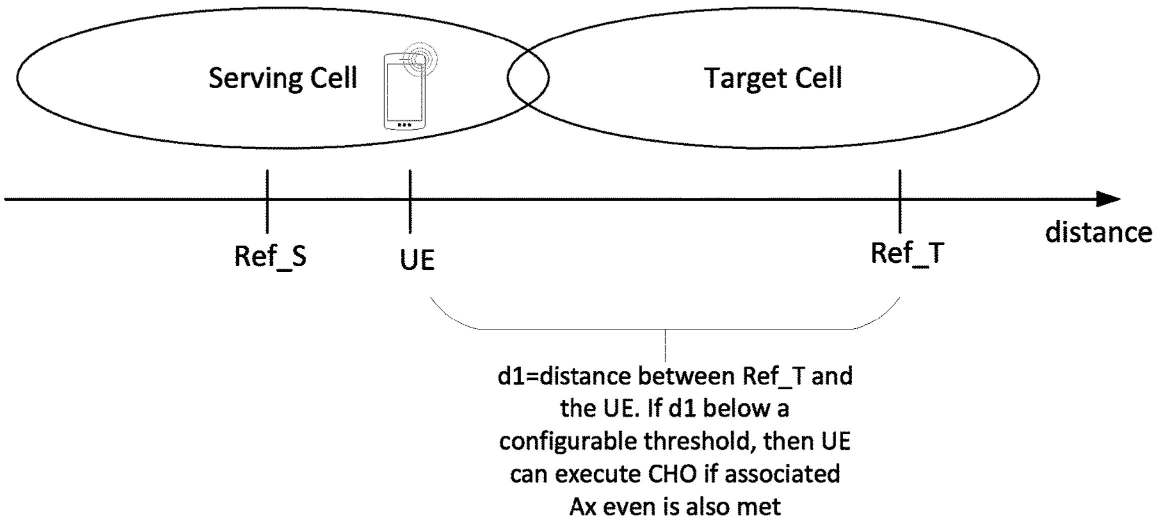
FIG. 3 illustrates an example of location-based CHO triggering in NTN, according to an embodiment.

In NTN, the CHO execution is not only linked to the (radio) condition such as measurement event A3, A4 or A5 (defined in RRC), but also to a location condition (distance to target cell reference location, such as cell center, being lower than a threshold) or time condition (measurement event A3, A4, A5 fulfilled within the time window [t1, t2]). These new conditions have been introduced as the received power level alone was not sufficient in NTN to decide whether mobility should be triggered (i.e., the reference signal received power (RSRP) at cell edge may not be largely different than RSRP measured at cell center). The principles of time-based triggering and location-based triggering in NTN are depicted in the examples of FIG. 2 and FIG. 3, respectively. More specifically, FIG. 2 illustrates an example of time-based CHO triggering in NTN, according to an embodiment. As illustrated in the example of FIG. 2, the UE is allowed to execute CHO to target cell 1 within the time window [t1, t2] if the associated condition (Ax) is met, and the UE is allowed to execute CHO to target cell 2 within the time window [t2, t3] if the associated condition is met. FIG. 3 illustrates an example of location-based CHO triggering in NTN, according to an embodiment. In the example of FIG. 3, d1 represents the distance between Ref_T and the UE. If the distance is below a configurable threshold, then the UE can execute CHO if the associated event (Ax) is also met.

CHO recovery is a mechanism allowing the UE to make use of the stored CHO configurations to recover from a failure, such as a Handover Failure (HOF) or Radio Link Failure (RLF). According to this approach, the UE performs cell selection, which is an inherent part of reestablishment procedure. If the selected cell is a CHO candidate cell, the UE may access it by applying the stored configuration and performing handover, abandoning the reestablishment procedure. Otherwise, the UE performs re-establishment procedure. No CHO-related condition is checked at CHO recovery.

An example implementation of a time-based trigger may include configuring the UE with two time-related values: t1 in the form of UTC (absolute time) and t2 in the form of a timer that will be started at time t1. In this implementation, t2 can measure the duration of the time window within which the UE can execute the CHO. This is shown in the example of FIG. 2, where for target cell 2 the absolute time UTC may correspond to t2, while the duration of period [t2, t3] may be controlled by the timer.

The distance-based triggering depicted in the example of FIG. 3 is based on checking the UE's location (obtained using GNSS) with respect to the serving cell's and the target cell's reference points, denoted by Ref_S and Ref_T, respectively. The UE may be configured with dedicated thresholds, possibly a separate one for serving cell and target cell. If the distance between UE and Ref_S is above the threshold (i.e., the UE is far away from the serving cell's reference location) and the distance between the UE and Ref_T is below the same or another threshold (i.e., the UE is close to target cell's reference location), the UE may execute the CHO, if radio-related condition (Ax) is also fulfilled.

In the CHO recovery procedure defined in Release-16 there is no condition checking, only cell reselection criteria are considered where radio signal quality and/or level is assessed. In NTN, however, the new CHO execution conditions have been introduced, i.e., the time-based and location-based triggering outlined above, as the cell may be available only in certain time window and/or in certain location. Thus, if just the radio-based condition is checked during cell selection then the UE may attempt to perform CHO recovery towards a cell that is about to disappear (i.e., its serving time is about to expire or the coverage over particular area is about to vanish).

Figure 4:
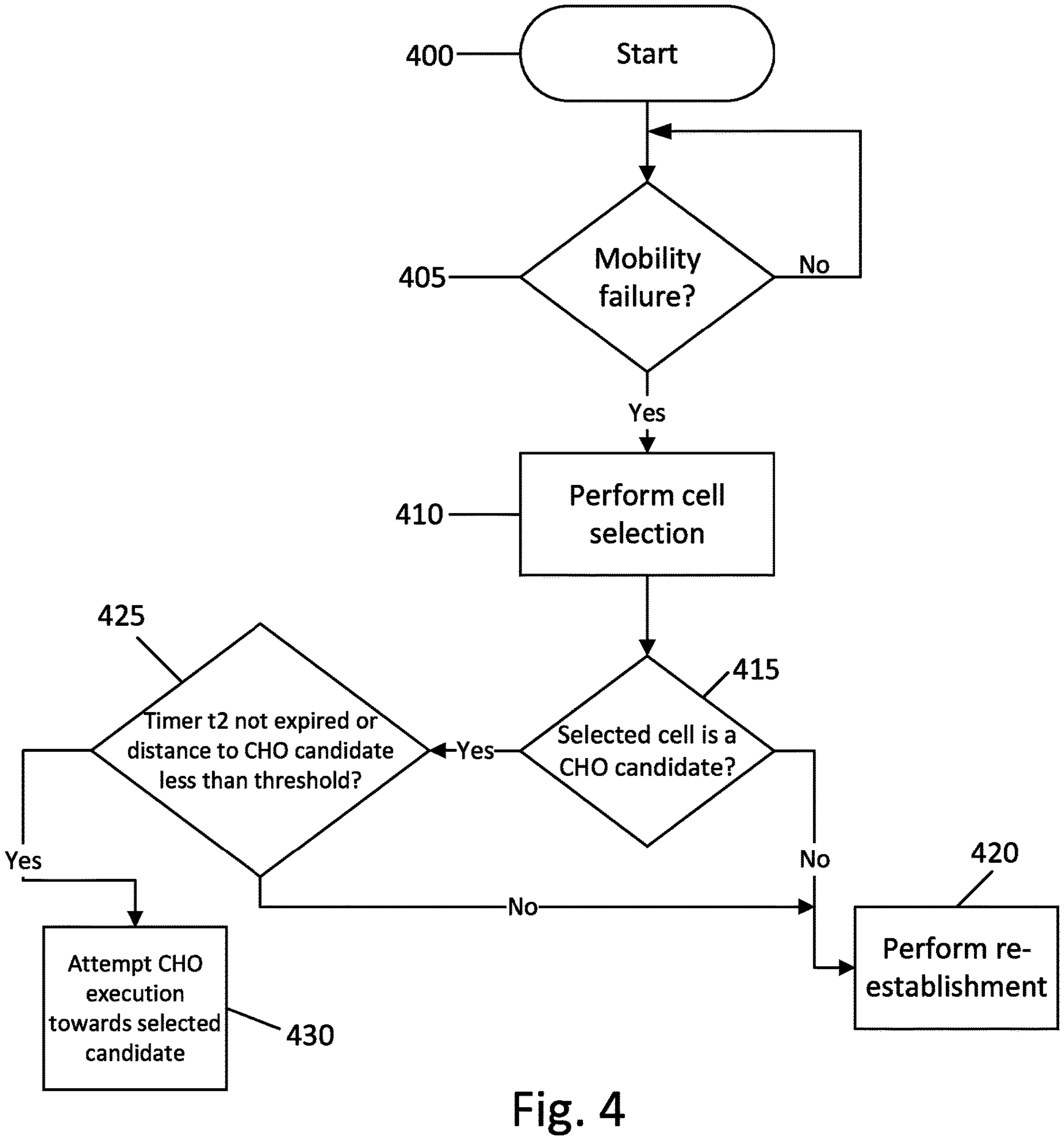
FIG. 4 illustrates an example flow diagram of a method for a CHO recovery, according to an embodiment.

Certain example embodiments provide methods and apparatuses that enhance the CHO recovery procedure. FIG. 4 illustrates an example flow diagram of a method for a CHO recovery, according to an embodiment. As illustrated in the example of FIG. 4, the method may start at 400 and, at 405, it may be determined if mobility failure has occurred. If no mobility failure has occurred, then the method may return to the start 400. If it is determined that mobility failure has occurred, then cell selection may be performed at 410 and, at 415, it may be determined whether the selected cell is a CHO candidate. If the selected cell is not a CHO candidate, then the method may include performing re-establishment at 420. If it is determined that the selected cell is a CHO candidate, then it may be determined, at 425, if the timer measuring t2 is not expired and/or if the distance to the CHO candidate is less than a threshold. In other words, according to this embodiment, if a selected cell within CHO recovery procedure is a CHO candidate, it may be additionally checked if a timer that expires at t2 is still running or if the distance d1 towards the CHO candidate is still below the configurable threshold. In some embodiments, t2 and d1 may refer to the values configured by the network for NTN CHO execution evaluation. However, according to certain embodiments, t2 and d1 can be separately configurable-specifically for the purpose of CHO Recovery procedure in NTN, while other values are used during CHO execution evaluation (i.e., prior to any failure). If it is determined at 425 that the timer t2 is not expired and/or the distance to the CHO candidate is less than the threshold, then the method may include, at 430, attempting CHO execution towards the selected candidate cell. If it is determined at 425 that the timer t2 is expired and/or the distance to the CHO candidate is not less than the threshold (e.g., depending which of the time-based or location-based condition is checked by the UE), then the method may include, at 430, performing re-establishment. Optionally, in an embodiment, the cell candidates can be ordered according to the values of t2, d1 or a combination of the two, where the first candidate is the best suited cell. Then, the condition does not have to be checked further after the cell is chosen.

Figure 5:
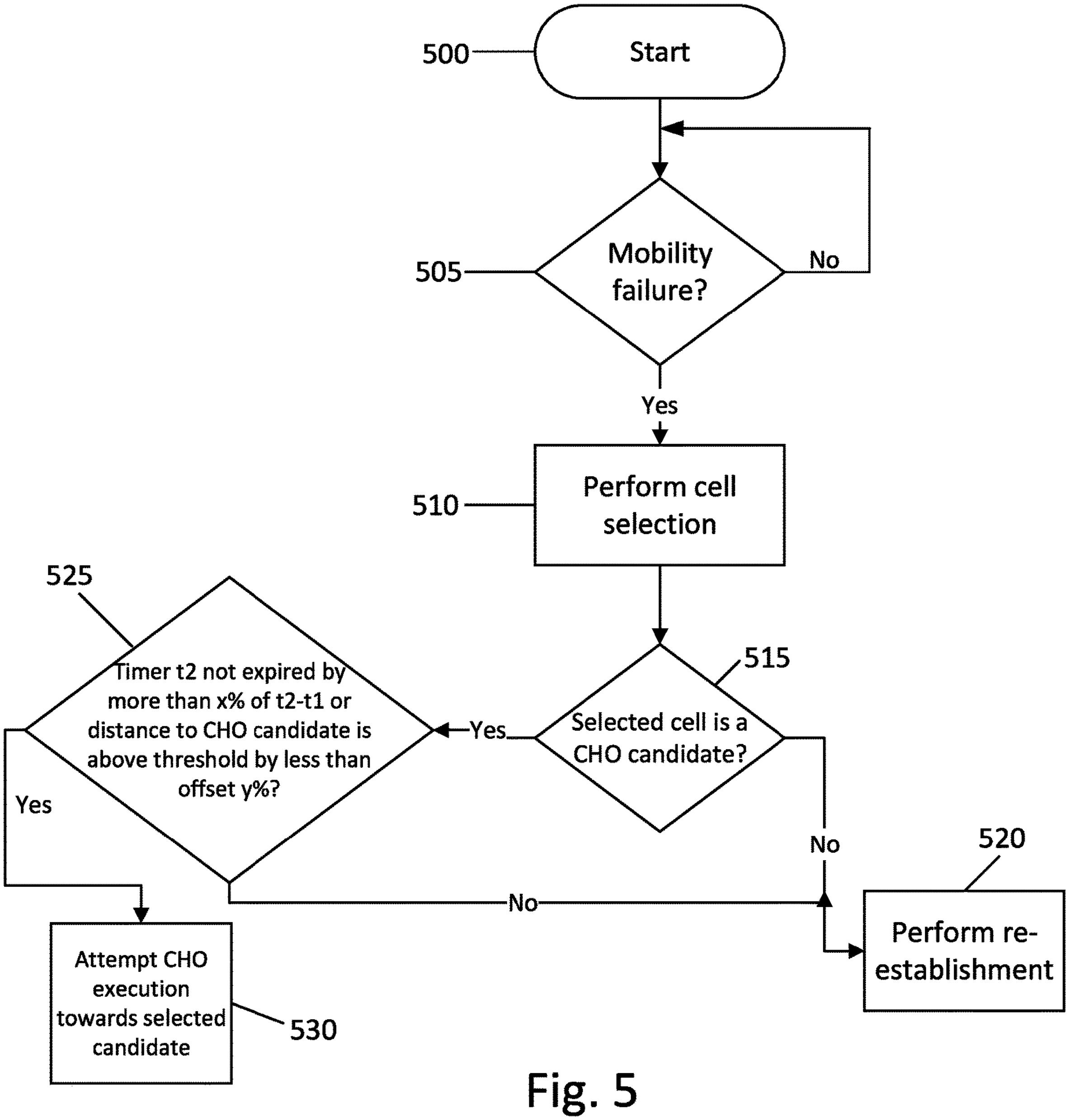
FIG. 5 illustrates another example flow diagram of a method for a CHO recovery, according to a further embodiment.

FIG. 5 illustrates another example flow diagram of a method for a CHO recovery, according to a further embodiment. In this example, the network may configure an offset value. The offset may define the degree by which the timer (t2) may be expired or how much the distance (d1) may be exceeded. As illustrated in the example of FIG. 5, the method may start at 500 and, at 505, it may determined if mobility failure has occurred. If no mobility failure has occurred, then the method may return to the start 500. If it is determined that mobility failure has occurred, then cell selection may be performed at 510 and, at 515, it may be determined whether the selected cell is a CHO candidate. If the selected cell is not a CHO candidate, then the method may include performing re-establishment at 520. If it is determined that the selected cell is a CHO candidate, then it may be determined, at 525, if the timer t2 is not expired by more than x % of t2 minus t1 (CHO execution window duration) or if the distance to the CHO candidate cell is above a threshold by less than the offset y %. If still within that offset, UE is allowed to perform CHO to the selected cell at 530, which is considered to be still a better option than to continue with the reestablishment. As mentioned above, one possibility may include to calculate the offset as a percentage of t2 minus t1 (e.g., x % of this calculated difference). It is noted that t1 here denotes the start of the time window [t1, t2] within which the UE was allowed to execute the CHO. Similarly, as long as the distance d1 is above the threshold by not more than y %, then the UE is allowed to perform CHO to the selected cell, at 530, in CHO recovery procedure for NTN. Optionally, the cell candidates can be ordered according to the percentage, where the first candidate is the one with the lowest value or percentage of exceeding the threshold. Then, the condition does not have to be checked further after cell is chosen.

Figure 6:
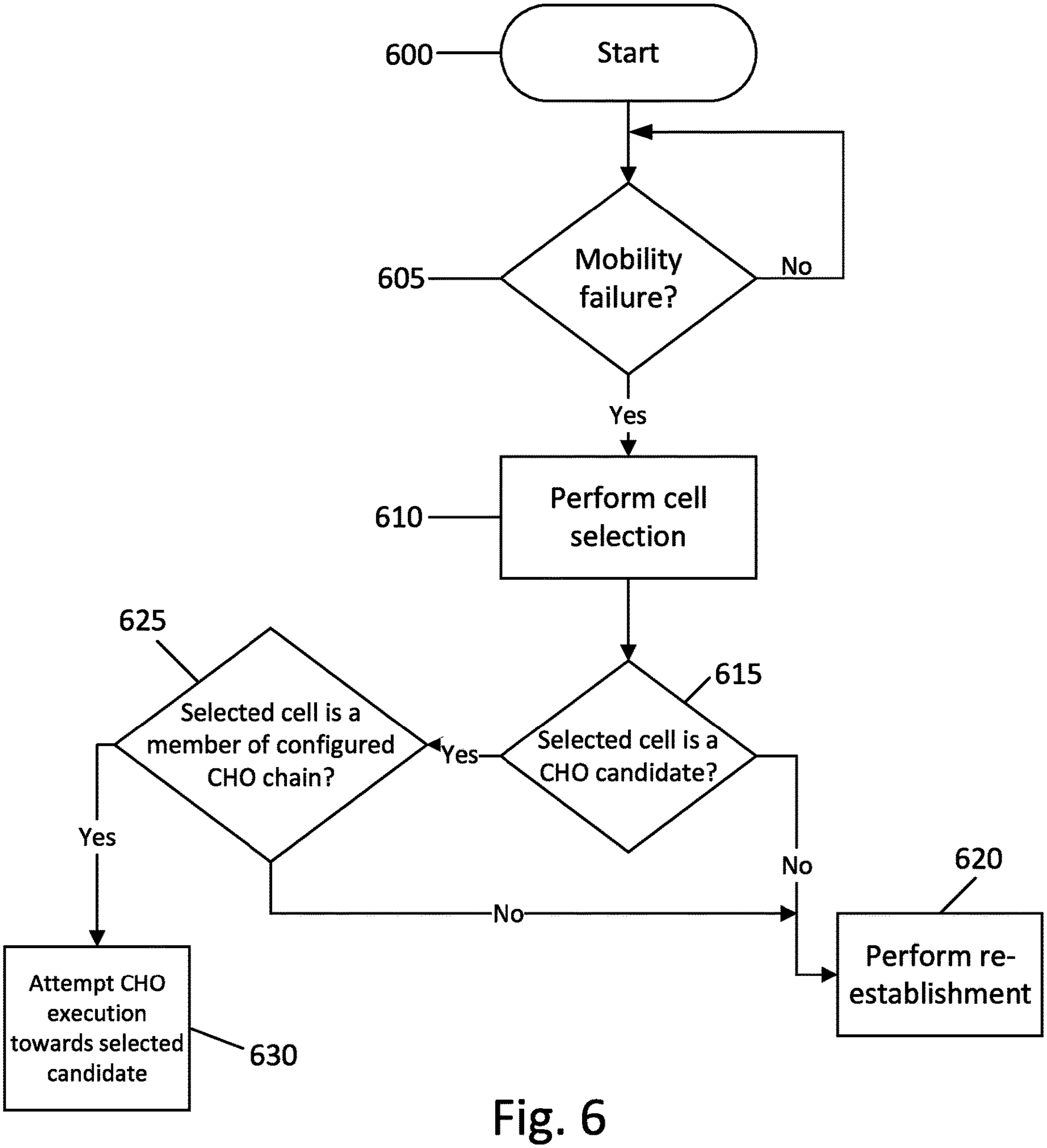
FIG. 6 illustrates another example flow diagram of a method for a CHO recovery, according to a further embodiment.

FIG. 6 illustrates an example flow diagram of a method for a CHO recovery, according to an embodiment. In this embodiment, as discussed further below, CHO recovery for NTN may also involve checking if the selected cell is within a chain of CHOs list. A CHO chain or chain of CHOs list may refer to a mechanism that allows the network to configure a chain of CHO target cells, i.e., preparing several conditional handovers in advance. The handovers may be chained in the sense that the source and (multiple) target cells are paired. This approach is feasible due to the predictable satellite movement. The network may optimize the chain by predicting, for example, when a certain Random Access Preamble should be reserved for a certain UE. For instance, according to an embodiment, the UE may have been configured beforehand with such a list of future cells for CHO execution, including their CHO-related conditions and CHO configurations.

As illustrated in the example of FIG. 6, the method may start at 600 and, at 605, it may be determined if mobility failure has occurred. If no mobility failure has occurred, then the method may return to the start 600. If it is determined that mobility failure has occurred, then cell selection may be performed at 610 and, at 615, it may be determined whether the selected cell is a CHO candidate. If the selected cell is not a CHO candidate, then the method may include performing re-establishment at 620. If it is determined that the selected cell is a CHO candidate, then it may be determined, at 625, if the selected cell is a member of the configured chain of CHOs list. If it is determined that the selected cell is a member of the chain of CHOs list at 625, then the UE may perform CHO towards that cell at 630, irrespective of whether the time and/or location-based condition is met. If it is determined that the selected cell is not a member of the chain of CHOs list at 625, then the UE may perform re-establishment at 620. Alternatively or additionally, the cells within the chain of CHO list may be directly prioritized in the cell reselection procedure (610). Then, the condition does not have to be checked further after cell is chosen (after 615).

It should be noted that the methods depicted in FIGS. 4-6 are some examples according to certain embodiments, and further examples or modifications are possible according to other embodiments. For instance, the example methods of FIGS. 4-6 may be combined in any suitable manner, according to certain embodiments. As one example, procedures 425, 525 and 625 may be combined such that one, more or all of the conditions are checked. Further, in some embodiments, the prioritization of the cells, as mentioned above can be performed before determining whether the selected cell is a CHO candidate at 415, 515 or 615.

According to certain embodiments, if the UE determines the time and/or location-based condition is not met for a CHO candidate, the UE can discard the CHO candidate's configuration. In some embodiments, the UE may delete all CHO configurations after it completes CHO recovery procedure. However, according to certain embodiments, the UE may delete all of the CHO configurations unless the UE is configured with a chain of CHOs list. For example, if the UE is configured with a chain of CHOs list, the UE can keep all of the CHO configurations for later or future CHO executions listed, but may delete just the CHO configurations for the current position in the list of CHOs.

In an embodiment, if the CHO recovery is enabled for a particular UE, the UE may continue the evaluation of [t1, t2] period (i.e., does not stop the timer t2) and/or continues monitoring the distance between the UE and Ref_T/Ref_S during the actual CHO execution attempt. If CHO Recovery is not enabled, the UE may ignore the time/distance related measurements for the candidate cells after CHO is triggered, as the UE is not allowed to recover via another CHO attempt.

In one embodiment, the UE may prioritize one suitable cell for CHO recovery over another by selecting the cell for which timer t2 will take a longer time to expire. In an embodiment, the UE may prioritize one suitable cell for CHO recovery over another by selecting the cell associated with the smallest distance d1.

Figure 7:
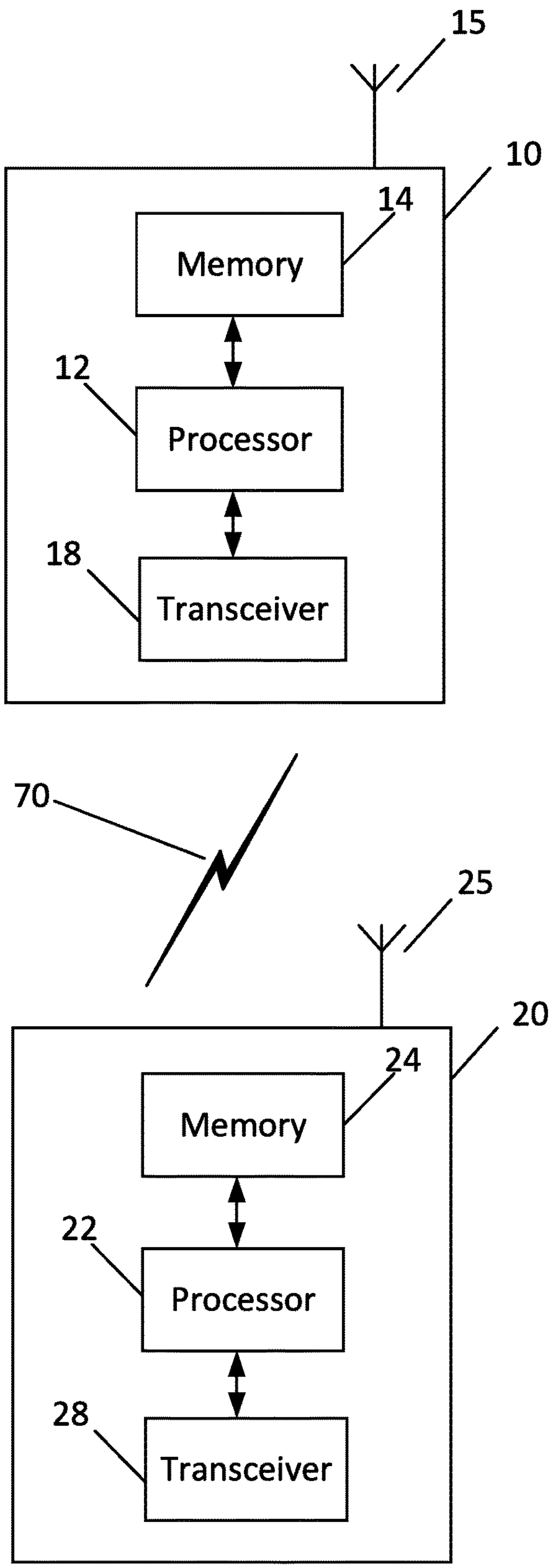
FIG. 7 illustrates an example block diagram of apparatuses, according to certain embodiments.

FIG. 7 illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, RRH, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may comprise an edge cloud server as a distributed computing system where the server and the radio node may be stand-alone apparatuses communicating with each other via a radio path or via a wired connection, or they may be located in a substantially same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7.

As illustrated in the example of FIG. 7, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 7, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an example embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some example embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an example embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some example embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain example embodiments, apparatus 10 may be or may be a part of a network element or RAN node, such as a base station, access point, Node B, eNB, gNB, TRP, RRH, HAPS, IAB node, relay node, WLAN access point, satellite, or the like. In one example embodiment, apparatus 10 may be a HAPS or other aircraft having a radio node. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIG. 1, 4, 5, or 6, or any other method described herein. In some embodiments, as discussed herein, apparatus 10 may be configured to perform a procedure relating to CHO recovery in NTN, for example.

For instance, in some embodiments, apparatus 10 may be controlled by memory 14 and processor 12 to configure one or more UEs for CHO recovery in NTN. Further, according to certain embodiments, apparatus 10 may be controlled by memory 14 and processor 12 to configure the UE(s) with one or more CHO execution conditions, as described elsewhere herein.

FIG. 7 further illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, CPE, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7.

As illustrated in the example of FIG. 7, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some example embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, CPE, or the like, for example. According to certain embodiments, apparatus 20 may be controlled by memory 24 and processor 22 to perform the functions associated with any of the embodiments described herein, such as one or more of the operations illustrated in, or described with respect to, FIG. 1, 4, 5, or 6, or any other method described herein. For example, in an embodiment, apparatus 20 may be controlled to perform a process relating to CHO recovery in NTN, as described in detail elsewhere herein.

According to certain embodiments, apparatus 20 may be controlled by memory 24 and processor 22 to, when a mobility failure occurs, select at least one cell of a NTN. In an embodiment, apparatus 20 may be controlled by memory 24 and processor 22 to determine whether the selected at least one cell is a CHO candidate cell. When it is determined that the selected at least one cell is a CHO candidate cell, apparatus 20 may be controlled by memory 24 and processor 22 to evaluate one or more CHO execution conditions. According to some embodiments, apparatus 20 may be controlled by memory 24 and processor 22 to evaluate the CHO condition(s) may performing at least one of: determining whether a timer measuring a duration of a time window within which the apparatus is allowed to execute the conditional handover is running or whether a distance between the apparatus and the selected at least one cell is below a configurable threshold, determining whether an expiration of the timer or the distance is within a defined offset, and/or determining whether the selected at least one cell is within a chain of conditional handovers list. When the evaluation of the CHO condition(s) determines that one or more of the CHO conditions are met, attempting to perform or performing the CHO procedure towards the selected at least one cell.

In an embodiment, when the evaluating of the CHO condition(s) determines that the CHO condition(s) are not met, apparatus 20 may be controlled by memory 24 and processor 22 to perform connection re-establishment.

According to an embodiment, the one or more CHO conditions can be considered to be met when at least one of the timer is still running and/or the distance is less than the configurable threshold. In some embodiments, at least one of the timer or the distance may have values configured by the network for the evaluation of the one or more CHO conditions. According to certain embodiments, the selecting of the at least one cell may include selecting the at least one cell from a list of cell candidates that are ordered according to the values of the timer and/or the distance, where a first candidate cell listed in the list is the best suited cell for the CHO. For example, in one embodiment, the best suited cell that is listed as the first candidate cell may be a cell having a lowest distance above the configurable threshold.

In an embodiment, the one or more CHO conditions can be considered to be met when at least one of a time since the expiration of the timer is below the defined offset and/or the distance is below the defined offset. According to certain embodiments, the offset may be defined as a percentage of a period between a start of the time window within which the apparatus 20 is allowed to execute the conditional handover and the timer, or the offset may be defined as a distance or a percentage of distance above the configurable threshold. According to certain embodiments, the selecting of the at least one cell may include selecting the at least one cell from a list of cell candidates that are ordered according to the percentage of the distance between the start of the time window within which the apparatus is allowed to execute the conditional handover and the timer, or ordered according to the percentage above the configurable threshold. In this case, a first candidate cell (e.g., the best suited cell for the CHO) listed in the list is a cell with the lowest amount of the distance or the lowest percentage exceeding the configurable threshold. In other words, in certain embodiments, the best suited cell for the CHO may be the cell with the lowest distance above the configurable threshold or the lowest percentage of the distance above the configurable threshold, or the cell with the lowest percentage above the time window within which the apparatus 20 is allowed to execute the conditional handover.

According to certain embodiments, the one or more CHO conditions can be considered to be met when the selected at least one cell is a member of the chain of CHOs list. In an embodiment, cells within the chain of CHOs list may be directly prioritized in a cell reselection procedure.

In some embodiments, when the evaluation of the CHO condition(s) determines that the one or more CHO conditions are not met, apparatus 20 may be controlled by memory 24 and processor 22 to discard a configuration for the selected at least one cell. According to an embodiment, apparatus 20 may be controlled by memory 24 and processor 22 to delete all CHO configurations after the CHO procedure is completed. According to certain embodiments, apparatus 20 may delete all of the CHO configurations except when apparatus 20 is configured with a chain of CHOs list. For example, if apparatus 20 is configured with a chain of CHOs list, then apparatus 20 can keep all of the CHO configurations for later or future CHO executions listed, but may delete just the CHO configurations for the current position in the list of CHOs.

In one embodiment, apparatus 20 may be controlled by memory 24 and processor 22 to continue, during the CHO attempt, at least one of running the timer or monitoring the distance between the apparatus 20 and the selected at least one cell. According to an embodiment, apparatus 20 may be controlled by memory 24 and processor 22 to ignore the timer or the distance measurements for CHO candidate cells after the CHO procedure is triggered.

According to certain embodiments, the selecting of the at least one cell may include prioritizing a cell for CHO over another cell by selecting the cell for which the timer will take a longer time to expire. In a further embodiment, the selecting of the at least one cell may include prioritizing a cell for conditional handover over another cell by selecting the cell associated with a smallest distance between the apparatus and the cell.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, sensors, circuits, and/or computer program code for causing the performance of any of the operations discussed herein.

Figure 8:
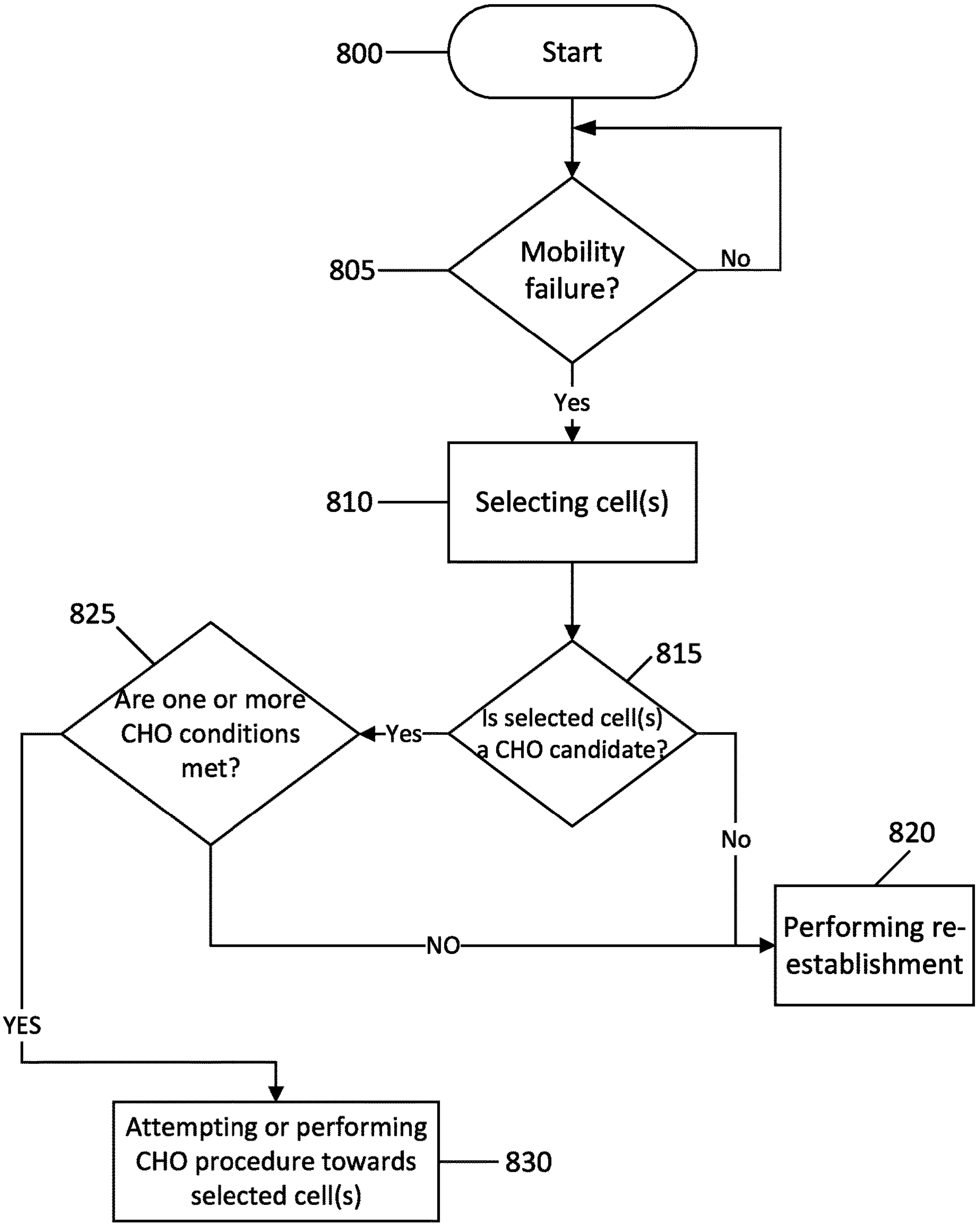
FIG. 8 illustrates a flow diagram of a method, according to some example embodiments.

FIG. 8 illustrates an example flow diagram of a method of CHO recovery in a NTN, according to an example embodiment. In certain example embodiments, the flow diagram of FIG. 8 may be performed by a communication device in a communications system, such as LTE or 5G NR. For instance, in some example embodiments, the communication device performing the method of FIG. 8 may include a UE, sidelink (SL) UE, wireless device, mobile station, IoT device, UE type of roadside unit (RSU), other mobile or stationary device, or the like.

As illustrated in the example of FIG. 8, the method may start at 800 and may include, at 805, determining whether mobility failure has occurred. When it is determined that mobility failure has not occurred, the method may return to the start at 800. However, when it is determined that mobility failure occurs, the method may include, at 810, selecting at least one cell of a NTN. In an embodiment, the method may then include, at 815, determining whether the selected at least one cell is a CHO candidate cell. If it is determined that the selected at least one cell is not a CHO candidate cell, then the method may include, at 820, performing connection re-establishment. When it is determined that the selected at least one cell is a CHO candidate cell, the method includes, at 825, evaluating one or more CHO conditions to determine if the CHO condition(s) are met. According to certain embodiments, the evaluating of the CHO condition(s) may include one or more of: determining whether a timer measuring a duration of a time window within which the UE is allowed to execute the CHO is running or whether a distance between the UE and the selected at least one cell is below a configurable threshold, and/or determining whether an expiration of the timer or the distance is within a defined offset, and/or determining whether the selected at least one cell is within a chain of CHOs list. When the evaluating at 825 determines that the one or more CHO conditions are met, the method may include, at 830, attempting the CHO procedure or performing the CHO procedure towards the selected at least one cell. However, when the evaluating at 825 determines that the one or more CHO conditions are not met, the method may include, at 820, performing connection re-establishment.

In an embodiment, the one or more CHO conditions can be considered to be met when at least one of the timer is still running or the distance is less than the configurable threshold. In a further embodiment, the one or more CHO conditions can be considered to be met when at least one of a time since the expiration of the timer is below the defined offset or the distance exceeding the configurable threshold is below the defined offset. In a further embodiment, the one or more CHO conditions can be considered to be met when the selected at least one cell is a member of the chain of CHOs list.

According to some embodiments, at least one of the timer or the distance have values configured by the network for the evaluating of the one or more CHO conditions. In one embodiment, the selecting 810 may include selecting the at least one cell from a list of cell candidates that are ordered according to the values of at least one of the timer or the distance, where a first candidate cell listed in the list is a best suited cell for the CHO.

According to an embodiment, the offset may be defined as a percentage of a period between a start of the time window within which the UE is allowed to execute the CHO and the timer, and/or the offset may be defined as a distance or a percentage of distance above the configurable threshold.

In certain embodiments, the selecting 810 may include selecting the at least one cell from a list of cell candidates that are ordered according to the percentage of the distance between the start of the time window within which the UE is allowed to execute the CHO and the timer or according to the percentage above the configurable threshold, where a first candidate cell listed in the list is a cell with a lowest percentage of the distance or a lowest percentage exceeding the configurable threshold.

According to an embodiment, cells within the chain of CHOs list may be directly prioritized in a cell reselection procedure.

In an embodiment, when the evaluating 825 determines that the one or more CHO conditions are not met, the method may include discarding a configuration for the selected at least one cell. According to some embodiments, the method may include deleting all CHO configurations after the CHO procedure is completed.

According to an embodiment, when CHO recovery is enabled for the UE, the method may include continuing, during the CHO attempt, at least one of running the timer or monitoring the distance between the UE and the selected at least one cell. In an embodiment, when CHO recovery is not enabled for the UE, the method may include ignoring the timer or the distance measurements for CHO candidate cells after the CHO execution is triggered.

According to certain embodiments, during a CHO recovery procedure, the selecting 810 may include prioritizing a cell for CHO over another cell by selecting the cell for which the timer will take a longer time to expire. In some embodiments, during a CHO recovery procedure, the selecting 810 may include prioritizing a cell for CHO over another cell by selecting the cell associated with a smallest distance between the UE and the cell.

In view of the foregoing, certain example embodiments provide several technological improvements, enhancements, and/or advantages over existing technological processes and constitute an improvement at least to the technological field of wireless network control and/or management. For example, as discussed in detail above, certain example embodiments can improve and enhance at least CHO recovery for NTN. For instance, some embodiments may utilize the distance to a target cell and/or relative time to the target cell as condition for CHO. In one aspect, the UE may prioritize one suitable cell for CHO recovery over another by picking the cell for which the timer (t2), which measures the duration of a time window within which the UE is allowed to execute the CHO, will take a longer time to expire. In a further aspect, the UE may prioritize one suitable cell for CHO recovery over another by picking the cell associated with the smallest distance (d1) between the UE and target cell. As such, example embodiments can provide fast cell selection resulting in faster CHO recovery. As a result, example embodiments improve the recovery after a CHO failure. This can be especially helpful in NTN as failures are more likely to happen in NTN and the normal recovery can fail or be non-optimal.

Accordingly, the use of certain example embodiments results in improved functioning of communications networks and their nodes, such as base stations, eNBs, gNBs, and/or IoT devices, UEs or mobile stations, or the like.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations needed for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Some embodiments described herein may use the conjunction "and/or". It should be noted that, when used, the term "and/or" is intended to include either of the alternatives or both of the alternatives, depending on the example embodiment or implementation. In other words, "and/or" can refer to one or the other or both, or any one or more or all, of the things or options in connection with which the conjunction is used.

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

| PARTIAL GLOSSARY: | |
|---|---|
| CHO | Conditional Handover |
| GEO | Geostationary Earth Orbit |
| GNSS | Global Navigation Satellite System |
| HO | Handover |
| HOF | Handover Failure |
| LEO | Low Earth Orbit |
| MR | Measurement Report |
| NTN | Non-Terrestrial Networks |
| NW | Network |
| RLF | Radio Link Failure |
| RRC | Radio Resource Control |
| UE | User Equipment |
| UTC | Universal Time Coordinated. |

The invention claimed is:

1. An apparatus, comprising:

at least one processor; and at least one memory comprising computer program code, the at least one memory and computer program code configured, with the at least one processor, to cause the apparatus at least to perform:

when a mobility failure occurs, selecting at least one cell of a non-terrestrial network;

determining whether the selected at least one cell is a conditional handover candidate cell;

when it is determined that the selected at least one cell is a conditional handover candidate cell, evaluating one or more conditional handover conditions, wherein the evaluating comprises at least one of:

determining whether a timer measuring a duration of a time window within which the apparatus is allowed to execute the conditional handover is running or whether a distance between the apparatus and the selected at least one cell is below a configurable threshold, or determining whether an expiration of the timer or the distance is within a defined offset, or determining whether the selected at least one cell is within a chain of conditional handovers list;

when the evaluating determines that the one or more conditional handover conditions are met, attempting the conditional handover procedure towards the selected at least one cell; and deleting all conditional handover configurations after the conditional handover procedure is completed.

2. The apparatus of claim 1, wherein, when the evaluating determines that the one or more conditional handover conditions are not met, the at least one memory and computer program code are configured, with the at least one processor, to cause the apparatus at least to perform connection re-establishment.

3. The apparatus of claim 1, wherein the one or more conditional handover conditions are met when at least one of the timer is still running or the distance is less than the configurable threshold.

4. The apparatus of claim 1, wherein the one or more conditional handover conditions are met when at least one of a time since the expiration of the timer is below the defined offset or the distance exceeding the configurable threshold is below the defined offset.

5. The apparatus of claim 1, wherein the one or more conditional handover conditions are met when the selected at least one cell is a member of the chain of conditional handovers list.

6. The apparatus of claim 1, wherein at least one of the timer or the distance have values configured by the non-terrestrial network for the evaluating of the one or more conditional handover conditions.

7. The apparatus of claim 1, wherein the selecting comprises selecting the at least one cell from a list of cell candidates that are ordered according to the values of at least one of the timer or the distance, wherein a first candidate cell listed in the list is a best suited cell for the conditional handover.

8. The apparatus of claim 1, wherein the offset is defined as a percentage of a period between a start of the time window within which the apparatus is allowed to execute the conditional handover and the timer, or wherein the offset is defined as a distance or a percentage of distance above the configurable threshold.

9. The apparatus of claim 8, wherein the selecting comprises selecting the at least one cell from a list of cell candidates that are ordered according to the percentage of the distance between the start of the time window within which the apparatus is allowed to execute the conditional handover and the timer or according to the percentage above the configurable threshold, wherein a first candidate cell listed in the list is a cell with a lowest percentage of the distance or a lowest percentage exceeding the configurable threshold.

10. The apparatus of claim 1, wherein cells within the chain of conditional handovers list are directly prioritized in a cell reselection procedure.

11. The apparatus of claim 1, wherein, when the evaluating determines that the one or more conditional handover conditions are not met, discarding a configuration for the selected at least one cell.

12. The apparatus of claim 1, wherein, when conditional handover recovery is enabled for the apparatus, the at least one memory and computer program code are configured, with the at least one processor, to cause the apparatus at least to perform:

continuing, during the conditional handover attempt, at least one of running the timer or monitoring the distance between the apparatus and the selected at least one cell.

13. The apparatus of claim 1, wherein, when conditional handover recovery is not enabled for the apparatus, the at least one memory and computer program code are configured, with the at least one processor, to cause the apparatus at least to perform:

ignoring the timer or the distance measurements for conditional handover candidate cells after the conditional handover execution is triggered.

14. The apparatus of claim 1, wherein, during a conditional handover recovery procedure, the selecting comprises prioritizing a cell for conditional handover over another cell by selecting the cell for which the timer will take a longer time to expire.

15. The apparatus of claim 1, wherein, during a conditional handover recovery procedure, the selecting comprises prioritizing a cell for conditional handover over another cell by selecting the cell associated with a smallest distance between the apparatus and the cell.

16. A method, comprising:

when a mobility failure occurs, selecting, by a user equipment, at least one cell of a non-terrestrial network;

determining, by the user equipment, whether the selected at least one cell is a conditional handover candidate cell;

when it is determined that the selected at least one cell is a conditional handover candidate cell, evaluating, by the user equipment, one or more conditional handover conditions, wherein the evaluating comprises at least one of:

determining whether a timer measuring a duration of a time window within which the user equipment is allowed to execute the conditional handover is running or whether a distance between the user equipment and the selected at least one cell is below a configurable threshold, or determining whether an expiration of the timer or the distance is within a defined offset, or determining whether the selected at least one cell is within a chain of conditional handovers list;

when the evaluating determines that the one or more conditional handover conditions are met, attempting the conditional handover procedure towards the selected at least one cell; and deleting all conditional handover configurations after the conditional handover procedure is completed.

17. The method of claim 16, wherein, when the evaluating determines that the one or more conditional handover conditions are not met, performing connection re-establishment.

18. The method of claim 16, wherein the one or more conditional handover conditions are met when at least one of the timer is still running or the distance is less than the configurable threshold.

19. A non-transitory computer readable medium comprising program instructions that, when executed by an apparatus, cause the apparatus to perform at least the following:

when a mobility failure occurs, selecting, by a user equipment, at least one cell of a non-terrestrial network;

determining, by the user equipment, whether the selected at least one cell is a conditional handover candidate cell;

when it is determined that the selected at least one cell is a conditional handover candidate cell, evaluating, by the user equipment, one or more conditional handover conditions, wherein the evaluating comprises at least one of:

determining whether a timer measuring a duration of a time window within which the user equipment is allowed to execute the conditional handover is running or whether a distance between the user equipment and the selected at least one cell is below a configurable threshold, or determining whether an expiration of the timer or the distance is within a defined offset, or determining whether the selected at least one cell is within a chain of conditional handovers list;

when the evaluating determines that the one or more conditional handover conditions are met, attempting the conditional handover procedure towards the selected at least one cell; and deleting all conditional handover configurations after the conditional handover procedure is completed.

* * * * *